United States Patent
Deck et al.

(10) Patent No.: US 8,636,040 B2
(45) Date of Patent: Jan. 28, 2014

(54) INSTALLATION FOR PACKAGING NO USING MASS FLOW METERS

(75) Inventors: Philippe Deck, Montreuil (FR); Luca Valsasina, Boulogne Billancourt (FR); Wilfried Legeron, Paris (FR)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 0 days.

(21) Appl. No.: 13/483,205

(22) Filed: May 30, 2012

(65) Prior Publication Data

US 2012/0312418 A1 Dec. 13, 2012

(30) Foreign Application Priority Data

Jun. 9, 2011 (FR) .................................... 11 55036

(51) Int. Cl.
*B65B 1/30* (2006.01)
*B65B 31/00* (2006.01)
*B65B 1/04* (2006.01)

(52) U.S. Cl.
USPC ................................. 141/95; 141/54; 141/99

(58) Field of Classification Search
USPC .......... 141/3, 4, 9, 20, 49, 54, 63, 65, 66, 92, 141/95, 99, 100; 137/3, 7, 93
See application file for complete search history.

(56) References Cited

U.S. PATENT DOCUMENTS

| 4,022,234 | A | * | 5/1977 | Dobritz ............................. 137/7 |
| 4,277,254 | A | * | 7/1981 | Hanson ........................ 48/189.1 |
| 4,621,927 | A | * | 11/1986 | Hiroi ............................. 366/132 |
| 4,807,663 | A |   | 2/1989 | Jones |
| 5,476,115 | A | * | 12/1995 | Lalumandier et al. ... 137/101.19 |
| 5,540,251 | A | * | 7/1996 | Mayeaux ........................ 137/88 |
| 5,826,632 | A | * | 10/1998 | Micke et al. ...................... 141/9 |

(Continued)

FOREIGN PATENT DOCUMENTS

| EP | 0 671 680 | 9/1995 |
| EP | 1 811 224 | 7/2007 |

(Continued)

OTHER PUBLICATIONS

French Search Report for related FR 1154975, Dec. 8, 2011.

(Continued)

*Primary Examiner* — Timothy L Maust
*Assistant Examiner* — Brandon J Warner
(74) *Attorney, Agent, or Firm* — Allen E. White

(57) ABSTRACT

An installation for packaging a gaseous NO/N$_2$ mixture into at least one container from a source (1) of gaseous NO and a source (2) of gaseous nitrogen is disclosed. The installation uses at least one filling system (3) comprising one or more filling stations (24) for gas containers (25). A first gas line (11) is fluidically connected to the source (1) of gaseous NO and to the filling system (3), and a second gas line (12) is fluidically connected to the source (2) of gaseous nitrogen and to the filling system (3). The first gas line (11) and the second gas line (12) each has a mass flow meter (4, 5), each mass flow meter (4, 5) being connected (14, 15) to a control device (6) collaborating with each mass flow meter (4, 5).

13 Claims, 4 Drawing Sheets

(56) References Cited

U.S. PATENT DOCUMENTS

| | | | |
|---|---|---|---|
| 6,152,192 A * | 11/2000 | Klotz et al. | 141/18 |
| 6,514,564 B2 * | 2/2003 | de Almeida Botelho et al. | 427/248.1 |
| 6,655,422 B2 * | 12/2003 | Shock | 141/83 |
| 6,779,568 B2 * | 8/2004 | Borck | 141/67 |
| 7,328,726 B2 * | 2/2008 | Cohen et al. | 141/9 |
| 7,415,995 B2 * | 8/2008 | Plummer et al. | 141/197 |
| 7,621,302 B2 * | 11/2009 | Shock et al. | 141/95 |
| 7,740,031 B2 * | 6/2010 | Egan et al. | 141/105 |
| 2003/0012709 A1 | 1/2003 | Xu et al. | |
| 2006/0060139 A1 * | 3/2006 | Meneghini et al. | 118/715 |
| 2010/0330207 A1 * | 12/2010 | Baldassarre et al. | 424/718 |
| 2012/0312416 A1 * | 12/2012 | De Villemeur et al. | 141/4 |
| 2012/0312417 A1 * | 12/2012 | De Villemeur et al. | 141/4 |
| 2013/0133780 A1 | 5/2013 | De Villemeur et al. | |

FOREIGN PATENT DOCUMENTS

| | | |
|---|---|---|
| FR | 2 811 909 | 1/2002 |
| FR | 2 890 761 | 3/2007 |
| FR | 2 914 393 | 10/2008 |
| GB | 871 561 | 6/1961 |
| GB | 2 250 328 | 6/1992 |

OTHER PUBLICATIONS

French Search Report for corresponding FR 1155036, Feb. 15, 2012.
French Search Report for related FR 1155037, Mar. 23, 2012.
French Search Report for related FR 1155038, Mar. 23, 2012.

* cited by examiner

INSTALLATION FOR PACKAGING NO USING MASS FLOW METERS

CROSS REFERENCE TO RELATED APPLICATIONS

This application claims the benefit of priority under 35 U.S.C. §119 (a) and (b) to French Application No. 1155036 filed Jun. 9, 2011, the entire contents of which are incorporated herein by reference.

BACKGROUND

The invention relates to an installation for packaging a gaseous $NO/N_2$ mixture into gas containers, particularly one or more gas cylinders, using mass flow meters, and to an associated packaging method.

Gaseous $NO/N_2$ mixtures are commonly used to treat pulmonary vasoconstrictions in adults or children, particularly in newborn infants suffering from primary pulmonary hypertension or in patients who have undergone cardiac surgery.

These $NO/N_2$ mixtures are conventionally packaged into steel gas cylinders. Typically, these cylinders contain, by volume, 100 to 1000 ppm of NO, the remainder being nitrogen ($N_2$). These cylinders usually have a water capacity of 2 to 50 liters, which means that a total charge of as much as 15 $m^3$ of $NO/N_2$ mixture can be admitted to them depending on the filling pressure, for example for a final pressure of the order of 200 to 300 bar.

The packaging of these mixtures, which means the filling of cylinders with these mixtures, is done at gas filling centres.

SUMMARY

However, given the low NO content in the mixture, which is typical of the order of a few hundred ppm by volume, it is not always easy to package these mixtures on an industrial scale and the mixture obtained is not always sufficiently accurate.

In particular, the current method of packaging this type of $NO/N_2$ mixture is based on measuring the pressure of NO admitted to the cylinders and calculating the target pressure of NO as a function of temperature, on the one hand, and on weighing the quantity of nitrogen in the cylinders, comparing this weight against that of a control cylinder, on the other.

Now, as FIG. 1 illustrates, this known method results in a low level of accuracy regarding the mixture because of various negative factors which are combined with one another, these being:

- a Bourdon effect which affects the hose of the weighing machine used to weigh the gas;
- limited accuracy of the NO pressure sensor; and
- a negative effect of temperature because the quantity of NO is determined using the following thermodynamic equation: $PV=ZnRT$, which is influenced by the temperature T of the gas.

The problem therefore is to propose an improved packaging method that provides good accuracy and increased reliability of the gaseous mixture thus produced and packaged, which mixture is far less, if at all, sensitive to the abovementioned negative factors.

The solution of the invention is therefore an installation for packaging a gaseous $NO/N_2$ mixture into at least one container, preferably in several containers simultaneously, comprising:

- a source of gaseous NO,
- a source of gaseous nitrogen,
- at least one filling system comprising one or more filling stations for filling one or more gas containers,
- a first gas line fluidically connecting the source of gaseous NO to the filling system, and
- a second gas line fluidically connecting the source of gaseous nitrogen to the filling system, characterized in that:

- the source of gaseous NO contains a gaseous premix of NO and nitrogen, and
- the first gas line and the second gas line each comprise a mass flow meter, each mass flow meter being connected to a control device collaborating with each mass flow meter.

Depending on circumstance, the installation of the invention may have one or more of the following technical features:

- the first gas line and the second gas line are fluidically connected to one another upstream of the filling system.
- the source of NO contains a gaseous premix formed of NO and of $N_2$ containing an NO content less than 40% by volume, preferably an NO content less than or equal to 30% by volume, more preferably still, an NO content less than or equal to 20% by volume.
- the source of NO contains a gaseous premix formed of NO and of $N_2$ containing an NO content of less than 10% by volume, the premix preferably containing an NO content less than or equal to 5% by volume, typically of the order of 4% by volume of NO, the remainder being nitrogen.
- the source of NO comprises one or more gas containers.
- the source of gaseous nitrogen is a liquid or gaseous nitrogen reservoir or a gaseous nitrogen supply line. If the source of gaseous nitrogen is a liquid nitrogen reservoir, a gas heater is provided in order to vaporize the liquid nitrogen and thus obtain gaseous nitrogen.
- it comprises a vent line fluidically connected to the first gas line and communicating with the ambient atmosphere.
- the gaseous flushing line and the vent line each comprise at least one valve for controlling the passage of gas.
- the control device receives, from each mass flow meter, gas mass signals indicative of the mass of gas passing through each mass flow meter.
- the control device is designed and able to use said gas mass signals indicative of the mass of gas passing through each mass flow meter in order to calculate one or more target mass set points.
- the control device acts on a regulating valve providing control over the flow of gas heading towards the system or systems and stopping the flow once the mass set point has been reached, and also acts on a bypass valve, preferably mounted in parallel with the regulating valve, and which is opened at a given moment T, for example in the middle of filling, to increase the flow heading towards the system or systems, thus shortening the filling time.
- the first gas line and the second gas line are fluidically connected to the filling system by a common line section.
- it comprises a gas flushing line fluidically connecting the second gas line, i.e. the line carrying nitrogen, to the downstream pad of the common section supplying gas to at least one system and/or to the upstream part of the first gas line, i.e. the line carrying NO. The gas flushing line therefore allows nitrogen to be carried to the filling hoses under pressure so as to keep them under pressure and avoid the ingress or infiltration of air not only at said hoses but also at the connections between the first gas line and the source or sources of NO.

the common section branches into subsections so that several filling systems can be connected and thus supplied simultaneously with gas.

the gas flushing line fluidically connects the second gas line to said subsections supplying gas to several filling systems. This allows each subsection to be supplied with nitrogen.

it comprises a purge line, also known as a purge circuit, fluidically connecting the filling system or systems to the atmosphere.

the purge line comprises an outlet to the atmosphere, and for preference the passage of gas to the outlet to the atmosphere is controlled by a control valve.

the purge line is fluidically connected to a pumping line comprising a vacuum pump. The vacuum pump has an outlet delivering the pumped gas to the atmosphere. This vacuum pump allows notably the cylinders to be kept under vacuum, i.e. under depression, during the cylinder purge phases that precede their actual filling, as explained hereinafter.

the purge line is fluidically connected to each system by the common section and/or subsections connecting the first and second gas lines to the system or system.

the control device comprises a computer or a controller such as a programmable controller. The control device runs software.

the packaging system comprises connecting members allowing several containers, preferably 1 to 20 gas cylinders, to be connected at once.

the container is a gas cylinder, preferably a gas cylinder with a body made of steel, of aluminium or of an aluminium alloy.

The invention also relates to a method for packaging an NO/$N_2$ gaseous mixture into one or more gas containers, in which method use is made of an installation according to the invention to fill the gas container or containers, the proportions of NO and of $N_2$ admitted to the gas container or containers being determined using mass flow meters.

According to the method, the NO comes from a source of NO containing a gaseous premix formed of NO and of $N_2$, the NO content of which is less than 40% by volume, preferably an NO content less than or equal to 30% by volume, more preferably still an NO content less than or equal to 20% by volume, advantageously less than 10% by volume.

For preference, the NO/$N_2$ gaseous mixtures packaged into gas cylinders by implementing the method and/or by using the installation of the invention contain a final NO content of between 100 and 1200 ppm by volume, preferably between 100 and 1000 ppm, the remainder being nitrogen.

BRIEF DESCRIPTION OF THE DRAWINGS

The invention will now be better understood by virtue of the description given hereinafter with reference to the attached figures in which:

FIG. 1 depicts the maximum possible errors in terms of NO content that there may be when an NO/nitrogen mixture (225 ppm; final pressure around 180 bar) is produced and packaged into gas cylinders of type B5 (water capacity for 5 liters) using a method and installation according to the prior art employing, as explained above, a measurement of the NO pressure and a weighing of the quantity of nitrogen in each cylinder to be compared against a control cylinder.

DESCRIPTION OF PREFERRED EMBODIMENTS

As may be seen, a potential maximum error with regard to NO content of almost 10% can be observed, this being generated by several negative factors which combine with one another, 7% of this figure being simply attributable to the Bourdon effect applied to the hose of the weighing machine used for weighing, to the limited accuracy of the NO pressure sensor, and to a negative effect of temperature.

Figure 1:
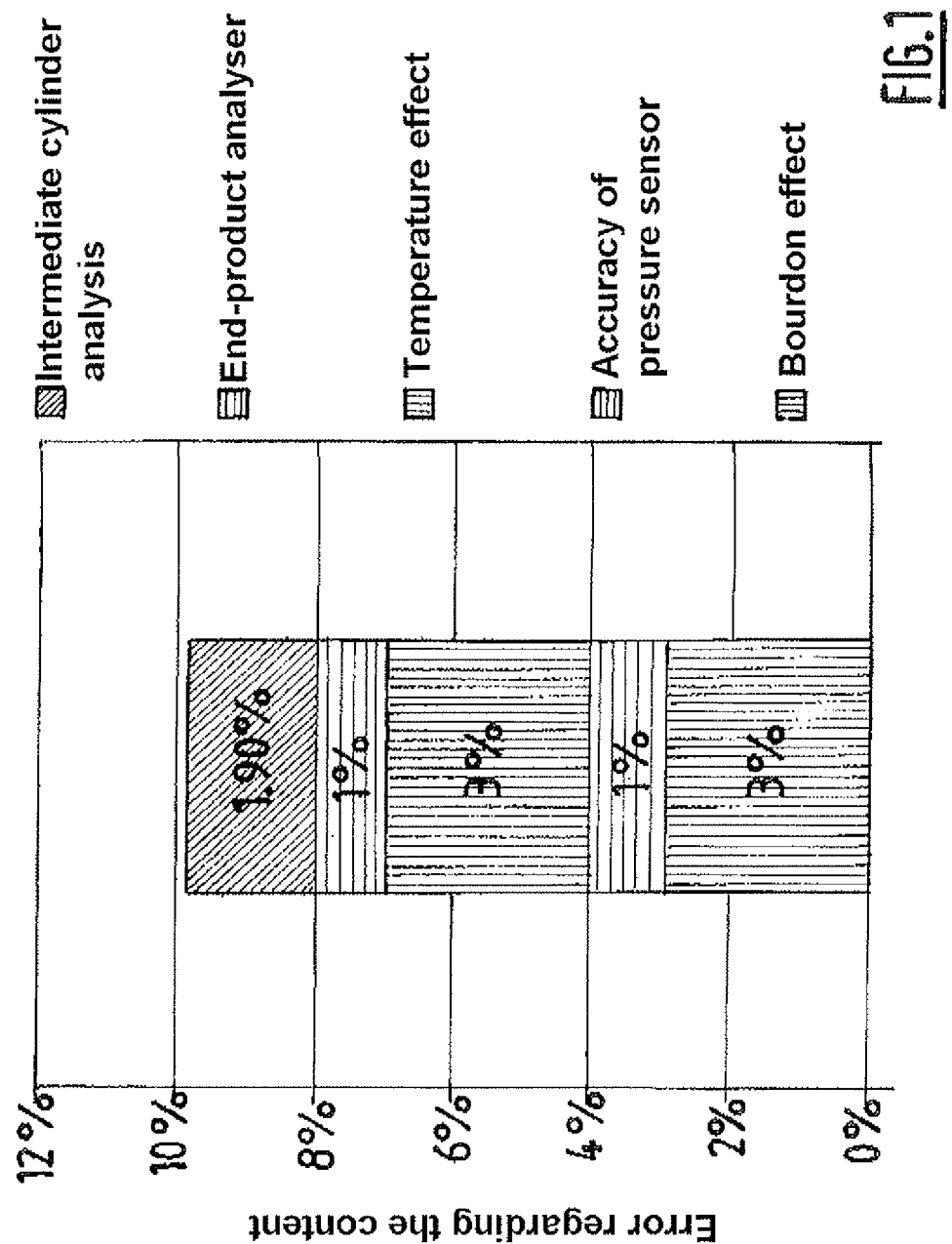
FIG. 1 illustrates the inaccuracies in terms of NO content obtained using a conventional packaging method and installation.
Figure 2:
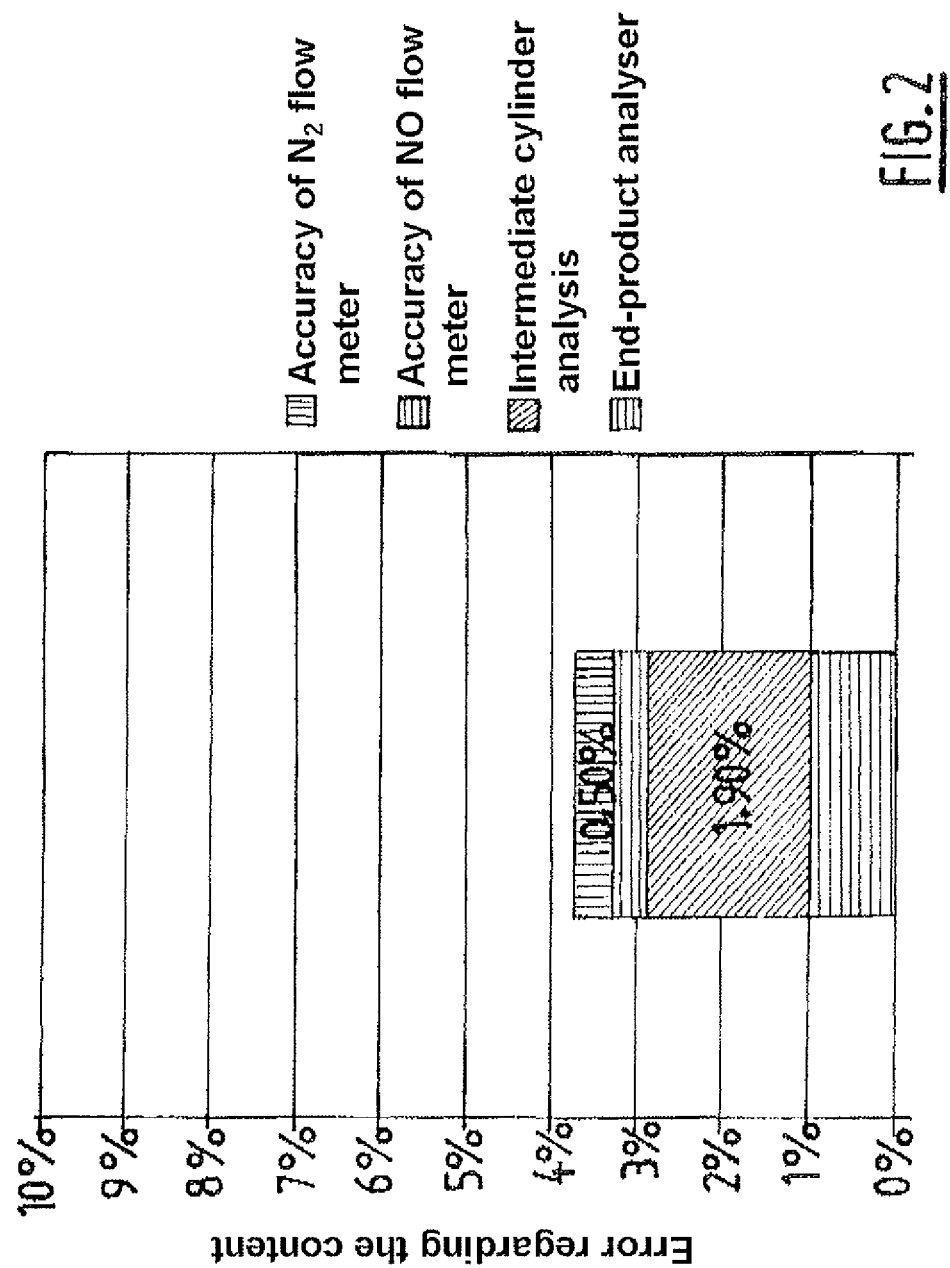
FIG. 2 illustrates the accuracy of NO content obtained using the packaging method and installation of the invention.

By way of comparison, as illustrated in FIG. 2, using an installation according to the invention, operation of which is based on the use of mass flow meters on the line carrying the gas containing the NO and the one carrying the nitrogen, it is possible greatly to reduce this error or inaccuracy with regard to NO content down to under around 1% in total, i.e., by reducing the measurement error from 7% to around 0.85% which corresponds to the limit of accuracy of mass flow meters.

To be specific, the use of mass flow meters makes it possible to escape from the aforementioned negative factors because no weighing takes place, the Bourdon effect is eliminated, no NO sensor is needed to measure the NO pressure and the temperature is not taken into consideration because the conversion of pressure to mass is no longer performed using the aforementioned temperature-dependent equation.

Figure 3:
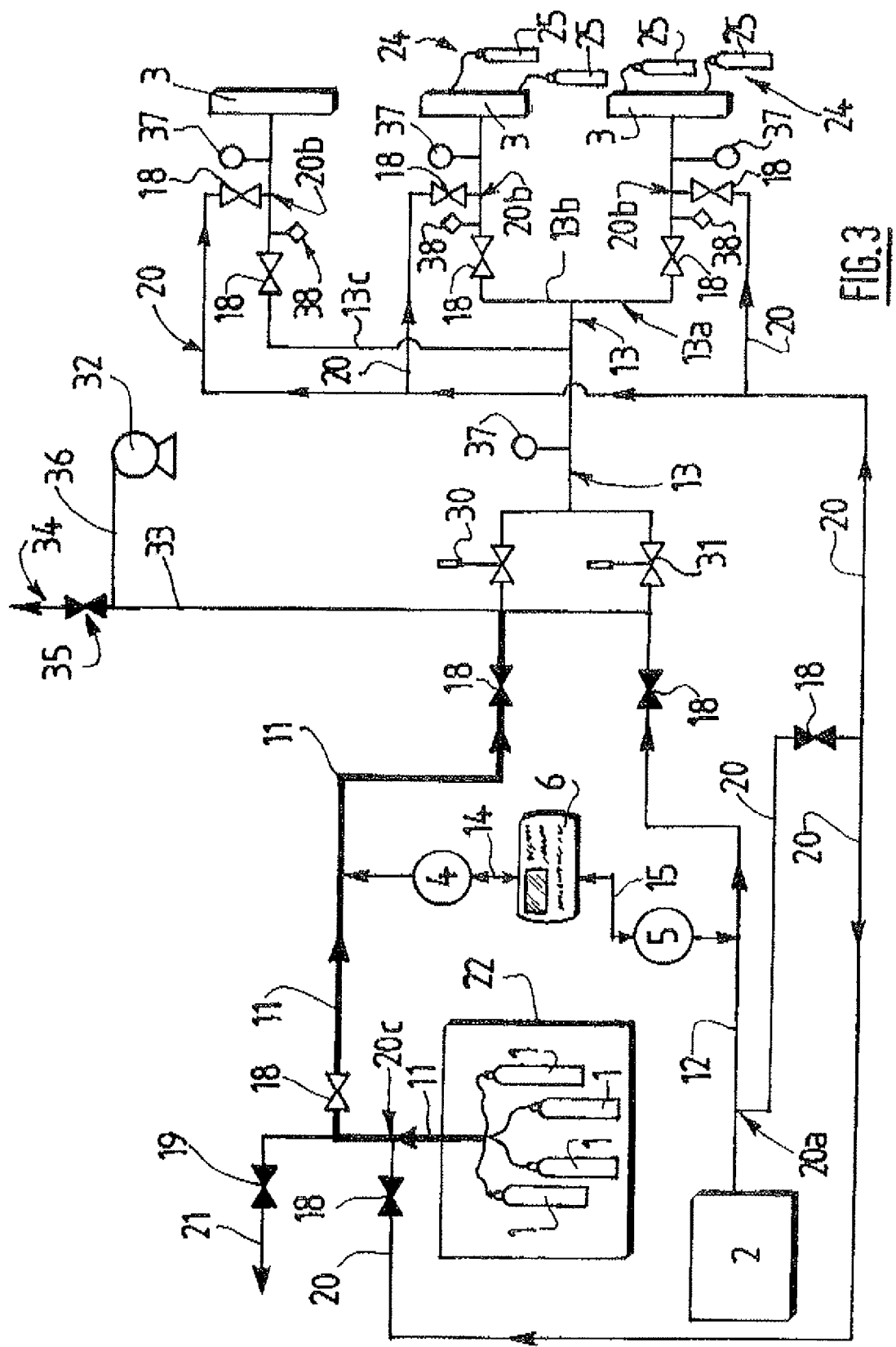
FIG. 3 illustrates one embodiment of an installation according to the invention.

FIG. 3 schematically depicts one embodiment of a packaging installation according to the invention which is used for producing NO/$N_2$ mixtures containing NO contents of the order of 100 to 1200 ppm by volume, the rest being nitrogen only.

This packaging installation comprises a source 1 of gaseous NO, for example one or more gas cylinders containing a premix of NO and nitrogen, for example an NO/$N_2$ mixture containing around 4% by volume of NO, and a source 2 of gaseous nitrogen, for example a reservoir of gaseous or liquid nitrogen, or alternatively a nitrogen supply line or network. In the case where the source 2 of gaseous nitrogen is a reservoir of liquid nitrogen, a gas heater (not depicted) is provided downstream of the source 2 in order to vaporize the liquid nitrogen and thus obtain gaseous nitrogen.

In the conventional way, use is made of one or more filling systems 3 each comprising several filling stations 24, with or without an individual valve for each container 25, for example 10 to 20 filling stations 24, in order to fill several containers 25, such as steel or aluminium gas cylinders, simultaneously with the desired NO/$N_2$ mixture.

FIG. 3 depicts three filling systems 3 which are supplied via the first and second gas lines 11, 12.

More specifically, a first gas line 11, i.e. a pipe carrying gas, fluidically connects the source 1 of gaseous NO to the filling systems 3, while a second gas line 12 itself fluidically connects the source 2 of gaseous nitrogen to said filling systems 3.

In fact, the first and second gas lines 11, 12 are connected to the system 3 via a common line section 13 which may branch into subsections 13a, 13b, 13c, particularly in its downstream part, i.e. in the vicinity of the systems 3.

In particular, the first line 11 comprises a nitrogen bypass valve 30 and the second line comprises a proportional valve 31 that allows the flow of nitrogen or of NO to be regulated; the role of these valves 30, 31 is detailed hereinafter.

According to the present invention, a mass flow meter 4, 5 is arranged on each of said first and second gas lines 11, 12 so as to be able to measure the mass quantities of NO and of $N_2$ passing through them.

These mass flow meters 4, 5 are connected, via electrical lines 14, 15, to a control device 6 such as a computer, a controller or the like, comprising a man/machine interface that allows an operator, for example via a touch-sensitive screen, to set point values.

This control device 6 uses control software for controlling the installation and notably operates the valves 30, 31.

In fact, the mass flow meters 4, 5 respectively measure the masses of NO and of nitrogen passing through them and transmit these measurements to the control device 6.

The control device 6 is itself set up with precalculated set points. A mass of NO—mass of $N_2$ pair corresponds to each cylinder size and concentration.

First of all, the software of the control device 6 recalculates the set up set points as a function of the specific parameters of the installation: configuration of the valves, dead volumes, number of cylinders connected, etc. This makes it possible to take into consideration the quantity of gas that is not to be found in the cylinders 25.

During filling, the change in admitted mass is monitored using the flow meters 4, 5. The control device 6 then reacts, through a command and control system, i.e. via an electrical signal that operates an electrically operated valve which, in turn, operates pneumatic valves, on the regulating 31 and bypass 30 valves in order to stop the flow of gas once the recalculated mass set point has been reached.

Stated differently, the control device 6 acts in real time on the two valves 30, 31, namely on the regulating valve 31 which has a very small section so as to control very accurately the flow of gas heading for the cylinders and so as to stop the flow once the mass set point has been reached, and also on the bypass valve 30 which is mounted in parallel with the regulating valve 31 and which for its part has a far larger section. In fact, this bypass valve 30 is opened in the middle of filling in order to increase the flow and shorten the filling time.

Moreover, the installation also comprises a vent line 21 fluidically connected to the first gas line 11 and communicating with the ambient atmosphere, the passage of gas to the atmosphere being controlled by a valve 19 arranged on said vent line 21.

The purge line 33 fluidically, via the common section 13, connects the filling systems 3 to a vent 34 and, also, to the pumping line 36 which fluidically connects a vacuum pump 32 to said purge line 33, so that the gases can be removed during the phases of purging the cylinders 25 and rinsing them with gas, as explained hereinafter.

Furthermore, the installation also comprises a gas flushing line 20 fluidically connecting the second gas line 12 carrying the nitrogen to the downstream part of the common section 13 supplying the systems 3 with gas and furthermore also to the upstream part of the first gas line 11 carrying the NO-based mixture.

As illustrated in FIG. 3, the gas flushing line 20 is connected, at the upstream end 20a, to the second gas line 12 and, at the downstream end, at 20c, to the first gas line 11, on the one hand, and at 20b to the various branched subsections 13a, 13b, 13c of the common section 13, on the other.

This gas flushing line 20 prevents the ingress of air into the hoses and subsections 13a, 13b, 13c and also into the upstream part of the first line 11, i.e. into the connection of the source or sources 1 of NO to said first line 11.

It should be noted that the subsections 13a, 13b, 13c each comprise a pressure gauge 38 and a pressure sensor 37.

The circulation of gas through the various lines is controlled in the conventional way by a collection of valves 18, including isolating valves, preferably actuated/controlled by the control device 6. However, some of the valves can be operated manually by the operator.

Furthermore, the source or sources 1 of NO are preferably arranged in an enclosure 22, such as a cabinet or the like.

Figure 4:
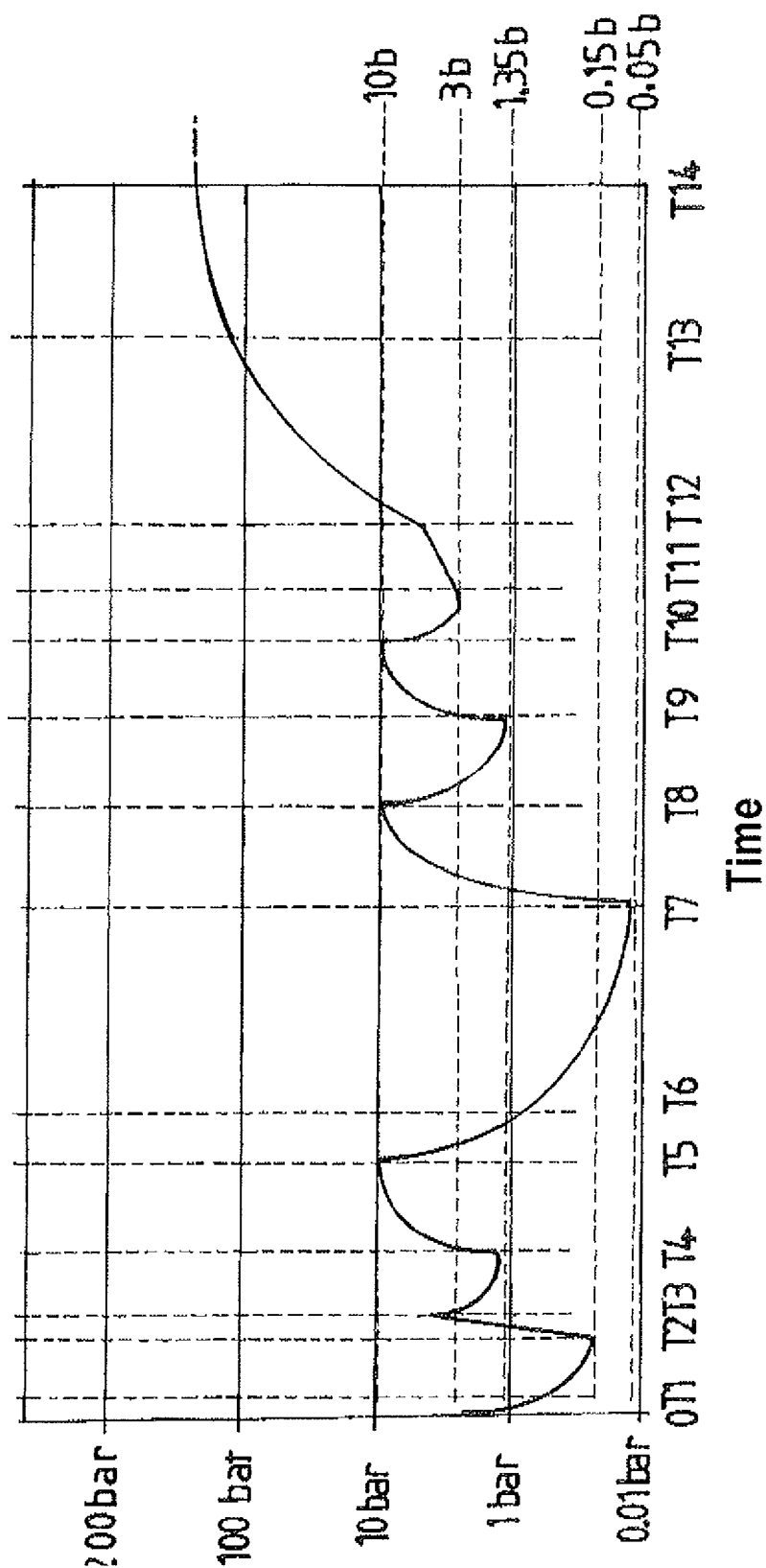
FIG. 4 schematically depicts a cycle for the packaging of gaseous NO/$N_2$ mixtures that can be implemented with the installation of FIG. 3.

The attached FIG. 4 schematically depicts one embodiment of a cycle for packaging gaseous $NO/N_2$ mixtures which can be applied in the context of the packaging method using the installation of the present invention, particularly the installation of FIG. 3.

As can be seen, this packaging cycle involves a number of successive steps, spaced out over time from T0 to T13, which are applied simultaneously to each cylinder 25 of the various filling stations 24 of the packaging system 3 and which are detailed hereinafter. Typically, the system 3 comprises 10 to 20 cylinders 25, for example 16 cylinders.

For the purposes of simplicity, the cycle will be explained in respect of just one of the cylinders 25, even though all of the cylinders 25 simultaneously experience said cycle comprising the steps spaced out between times T0 and T13.

Between T0 and T1, the hoses of the installation are emptied to the open air, i.e. the internal volume of the filling hoses is placed in fluidic communication with the ambient atmosphere in order to remove any potential residual overpressure there might be. During this phase, the valve or valves of the gas containers 25 connected to the hoses are closed, so no exchange of gas with the container or containers 25 can take place.

Between T1 and T2, the vacuum pump 32 is used to place the inside of the hoses under a connected depression, i.e. under a pressure below atmospheric pressure, for example of the order of 0.15 bar, thus making it possible to remove any residual gas and/or air contained therein. This phase is therefore also performed with the cylinder valve closed. Placing the hoses under vacuum is a safety measure which makes it possible to check that all the hoses are correctly connected and that there are no leaks. Specifically, if there was a leak or if a hose was incorrectly connected, it would not be possible to establish a stable vacuum.

Between T2 and T3, the operator opens the valve on each cylinder 25 and the residual pressure present in each cylinder 25 then rises as far as the pressure sensor 37, which detects said rise in pressure. Typically, the residual pressure in the cylinder 25 is of the order of around 3 to 4 bar absolute. After T2, no further rinsing of the container 25 with nitrogen gas takes place.

Between T3 and T4, the actual treatment of each cylinder 25 begins. More specifically, each cylinder 25 is vented to the atmosphere, i.e. the gas contained in the cylinder 25 is allowed to escape to the external atmosphere 34, via the line 33, under the simple effect of the difference in pressure between the inside and the outside of the cylinder, so as to raise the internal pressure of the cylinder to atmospheric pressure. At T4, the internal pressure of the gas cylinder 25 is therefore more or less equal to atmospheric pressure, i.e. of the order of 1 to 1.5 bar absolute.

Between T4 and T5, the cylinder 25 is rinsed with nitrogen taken from the source 2 while its internal pressure is raised to around 10 bar. The addition of nitrogen is performed via the second gas line 12 fed from the source 2 of nitrogen under pressure so as to raise the internal pressure of the cylinder to the desired pressure.

Between T5 and T6, the nitrogen contained in each cylinder 25 is again allowed to escape to the atmosphere (at 34), which allows any impurities that might be present in the cylinder to be removed.

Between T6 and T7, the cylinder is purged by placing its internal volume under depression by withdrawing the residual gas contained therein using the vacuum pump 32 and the pumping line 36 until an internal depression of below 0.2 bar abs, preferably of below 0.1 bar, and for example of the order of 0.05 bar is reached.

Between T7 and T8, the cylinder, as before, undergoes a further rinsing with nitrogen to raise its internal pressure to around 10 bar, as between T4 and T5.

Between T8 and T9, the cylinder 25 is once again exhausted (at 34) to the ambient atmosphere as during the times T5 and T6. The residual gas pressure is then kept at around 1.35 bar in order to avoid unwanted ingress of atmospheric contaminants.

Between T9 and T10, the cylinder once again undergoes additional rinsing with nitrogen to raise its internal pressure to around 10 bar, as before.

Between T10 and T11, the nitrogen is discharged into the atmosphere, as between T8 and T9 and between T5 and T6, but this time maintaining a residual internal pressure of the order of 3 bar.

Between T11 and T12, a gaseous premix formed of NO and $N_2$ containing an NO content less then 10% by volume is admitted to each cylinder 25 in order to reach a first filling pressure P1 with P1>1 bar, typically a pressure P1 of the order of 2 to 10 bar abs, preferably of around 3 to 5 bar abs, for example a pressure P1 of the order of 4 bar. Advantageously, the gaseous premix formed of NO and of $N_2$ contains an NO content of the order of 4% by volume. The gaseous premix formed of NO and of $N_2$ comes from the cylinders 1 and is carried by the first line 11 and then by the common section 13, 13a, 13b, 13c.

Next, between T12 and T13, gaseous nitrogen carried by the second line 12 then by the common section 13, 13a, 13b, 13c is admitted to the container containing the NO/$N_2$ premix at the first pressure P1, to obtain a final gaseous NO/$N_2$ mixture containing an NO content less than or equal to 1200 ppm by volume, for example a final NO content of 200 to 800 ppm, and a second pressure P2 of between P1 and 800 bar, for example in this instance a pressure of 180 to 200 bar.

The quantities of gas ($N_2$ and NO/$N_2$) admitted to the cylinders are regulated using the mass flow meters 4, 5, the bypass 30 and proportional flow regulating 31 valves, and the control device 6 as explained hereinabove.

The gaseous NO/$N_2$ mixtures thus produced can be used to treat pulmonary vasoconstrictions in adults or children, particularly in newborn babies suffering from primary pulmonary hypertension or patients who have undergone cardiac surgery.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. An installation for packaging a gaseous nitric oxide/nitrogen (NO/$N_2$) mixture into at least one container comprising:
   a source (1) of gaseous nitrogen (NO),
   a source (2) of gaseous nitrogen ($N_2$),
   at least one filling system (3) comprising one or more filling stations (24) configured to be capable of filling gas containers (25),
   a first gas line (11) fluidically connecting the source (1) of gaseous NO to the filling system (3), and
   a second gas line (12) fluidically connecting the source (2) of gaseous nitrogen to the filling system (3),
   wherein the source (1) of gaseous NO contains a gaseous premix of NO and nitrogen, and the first gas line (11) and the second gas line (12) each comprise a mass flow meter (4, 5), each mass flow meter (4, 5) being connected (14, 15) to a control device (6) collaborating with each mass flow meter (4, 5),
   wherein the first gas line (11) and the second gas line (12) are fluidically connected to the filling system (3) by a common line section (13),
   wherein the control device (6) acts on a regulating valve (31) adapted to control a flow of gas heading for the system or systems (3) from common line section (13) and adapted for stopping a flow when at least one mass set point has been reached,
   wherein the control device (6) also acts on a bypass valve (30) configured to increase the flow of gas heading towards the system or systems (3) from common line section (13) relative to the regulating valve (31), and
   wherein the control device (6) is a computer specifically programmed to act in real time on the regulating valve (31) and the bypass valve (30) to cause one to be open while the other is closed.

2. The installation of claim 1, wherein the source (1) of NO contains a gaseous premix formed of NO and of $N_2$ containing an NO content of less than 10% by volume.

3. The installation of claim 2, wherein the premix preferably containing an NO content less than or equal to 5% by volume.

4. The installation of claim 1, wherein the common line section (13) branches into several subsections (13a-13c).

5. The installation of claim 1 further comprising a gas flushing line (20) fluidically connecting (20a) the second gas line (12) to a downstream part (20b) of the common line section (13) supplying gas to at least one system (3) and/or to an upstream part (20c) of the first gas line (11).

6. The installation of claim 5, wherein the gas flushing line (20) fluidically connects (20a) the second gas line (12) to subsections (13a-13c) supplying gas to several filling systems (3).

7. The installation of claim 6, wherein the control device (6) is configured to calculate one or more target mass set points based on said gas mass signals indicative of the mass of gas passing through each mass flow meter (4, 5).

8. The installation of claim 5, wherein the gas flushing line (20) is fluidically connected to the common line section (13) or subsections (13a-13c).

9. The installation of claim 5, wherein the gas flushing line (20) comprises an outlet to the atmosphere (34) and/or is fluidically connected to a pumping line (36) fluidically connected to a vacuum pump (32).

10. The installation of claim 1, wherein the control device (6) receives, from each mass flow meter (4, 5), gas mass signals indicative of the mass of gas passing through each mass flow meter (4, 5).

11. The installation of claim 1, wherein the control device (6) comprises a computer.

12. The installation of claim 1, wherein the packaging system (3) comprises connection members allowing several connectors (25) to be connected at a time.

13. The installation of claim 12, wherein the several connectors are from 2 to 20.

* * * * *